United States Patent
Richards, III

(10) Patent No.: US 8,261,103 B2
(45) Date of Patent: Sep. 4, 2012

(54) SYSTEMS AND METHODS FOR CONTROLLING POWER DELIVERY TO SYSTEM COMPONENTS

(75) Inventor: George Richards, III, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 385 days.

(21) Appl. No.: 12/607,733

(22) Filed: Oct. 28, 2009

(65) Prior Publication Data

US 2011/0099395 A1    Apr. 28, 2011

(51) Int. Cl.
*G06F 1/26* (2006.01)

(52) U.S. Cl. .......................... 713/300; 713/310

(58) Field of Classification Search .................. 713/300, 713/310
See application file for complete search history.

(56) References Cited

U.S. PATENT DOCUMENTS

| | | | |
|---|---|---|---|
| 5,952,733 A | 9/1999 | Johnston | |
| 6,563,294 B2 * | 5/2003 | Duffy et al. | 323/283 |
| 6,802,014 B1 | 10/2004 | Suurballe | |
| 6,903,537 B2 * | 6/2005 | Tzeng et al. | 323/268 |
| 6,917,188 B2 | 7/2005 | Kernahan | |
| 6,928,560 B1 * | 8/2005 | Fell et al. | 713/300 |
| 6,965,220 B2 | 11/2005 | Kernahan et al. | |
| 7,023,187 B2 | 4/2006 | Shearon et al. | |
| 7,373,527 B2 * | 5/2008 | Chapuis | 713/300 |
| 7,394,445 B2 | 7/2008 | Chapuis et al. | |
| 7,459,892 B2 | 12/2008 | Chapuis | |
| 7,782,029 B2 * | 8/2010 | Chapuis et al. | 323/267 |
| 2004/0123164 A1 * | 6/2004 | Chapuis et al. | 713/300 |
| 2004/0124932 A1 * | 7/2004 | Lu | 331/57 |
| 2007/0097563 A1 * | 5/2007 | Hagiwara et al. | 361/18 |

\* cited by examiner

*Primary Examiner* — Nitin Patel

(74) *Attorney, Agent, or Firm* — Baker Botts L.L.P.

(57) ABSTRACT

Systems and methods for controlling power delivery to system components are disclosed. A Centralized Integrated Power Management Controller is disclosed which includes a controller and a power stage communicatively coupled to the controller through a control bus and a power telemetry bus. The Centralized Integrated Power Management Controller includes an intelligence control unit in the controller corresponding to the power stage. The intelligence control unit drives the power stage through the control bus.

12 Claims, 2 Drawing Sheets

SYSTEMS AND METHODS FOR CONTROLLING POWER DELIVERY TO SYSTEM COMPONENTS

TECHNICAL FIELD

The present disclosure relates generally to power system architectures, and, more particularly, to a system and method for management of power subsystems in an information handling system.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system will typically include a power supply mechanism. The different components of an information handling system often operate at different designated current and voltage levels. Moreover, discrete circuits within the information handling system may operate at a relatively low voltage and a relatively high current. In order to meet the various power supply requirements within the information handling system, minimize unwanted power dissipation and accommodate changes in load requirements, Point-of-Load ("POL") voltage regulators may be placed at discrete points of power consumption within the information handling system. Specifically, each discrete circuit within the information handling system may be associated with a POL voltage regulator which may convert an intermediate bus voltage to the voltage and current level required by that circuit.

Typically, an intermediate bus architecture is utilized to manage the collection of POL voltage regulators with very little overall system integration. Moreover, in order to enhance system performance and maximize energy savings, it is important to increase the amount and quality of power telemetry data coming from the power system while it is in use. However, the amount of data and algorithms necessary to increase the amount and quality of power telemetry data would be taxing on the system resources.

SUMMARY

In one exemplary embodiment, a Centralized Integrated Power Management Controller is disclosed. The Centralized Integrated Power Management Controller includes a controller; a power stage communicatively coupled to the controller through a control bus and a power telemetry bus; and an intelligence control unit in the controller corresponding to the power stage. The intelligence control unit drives the power stage through the control bus.

In another exemplary embodiment, a method for centrally controlling a plurality of power stages is disclosed. A controller is communicatively coupled to each of the plurality of power stages through a control bus and a power telemetry bus and control signals are delivered from the controller to each of the plurality of power stages through the control bus. Telemetry data is received at the controller from each of the plurality of power stages through the power telemetry bus and the control signal sent to each of the plurality of power stages is adjusted based on the telemetry data received from that power stage.

Thus, the present disclosure provides apparatuses and methods for efficient and robust control of power delivery to system components. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
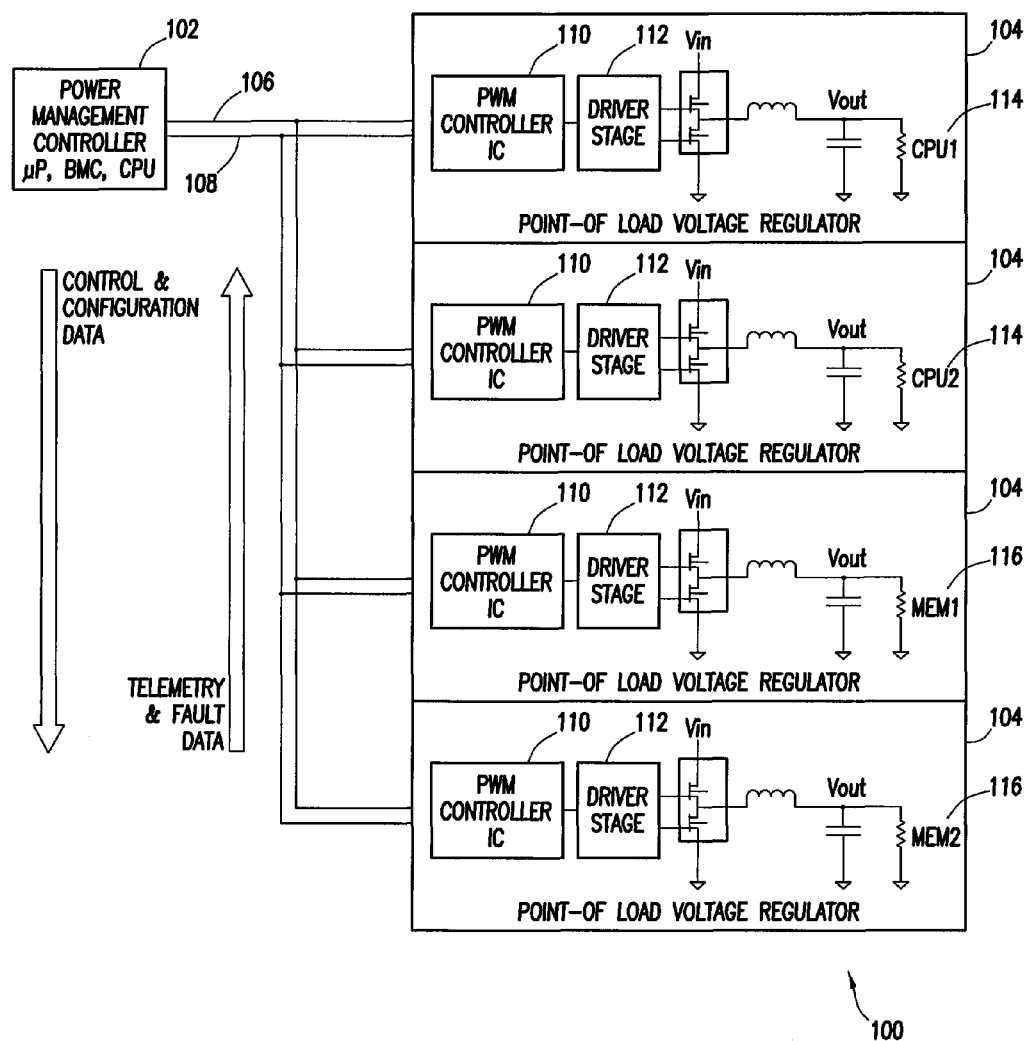
FIG. 1 is a block diagram of a system power controller in accordance with the prior art.

Shown in FIG. 1 is a block diagram of a typical system power controller shown generally by reference numeral 100. As depicted in FIG. 1, a power management controller (PMC) 102 may send control data to the POL voltage regulators 104 over a first bus 106 and receive telemetry data from the POL voltage regulators 104 over a second bus 108. Additionally, each POL voltage regulator is equipped with a corresponding Pulse Width Modulation {PWM) controller IC 110 and a driver stage 112 which handles the intelligence functions of the POL voltage regulators 104. The voltage regulators 104 may control power delivery to a number of different components such as CPUs 114 or memory units 116.

Figure 2:
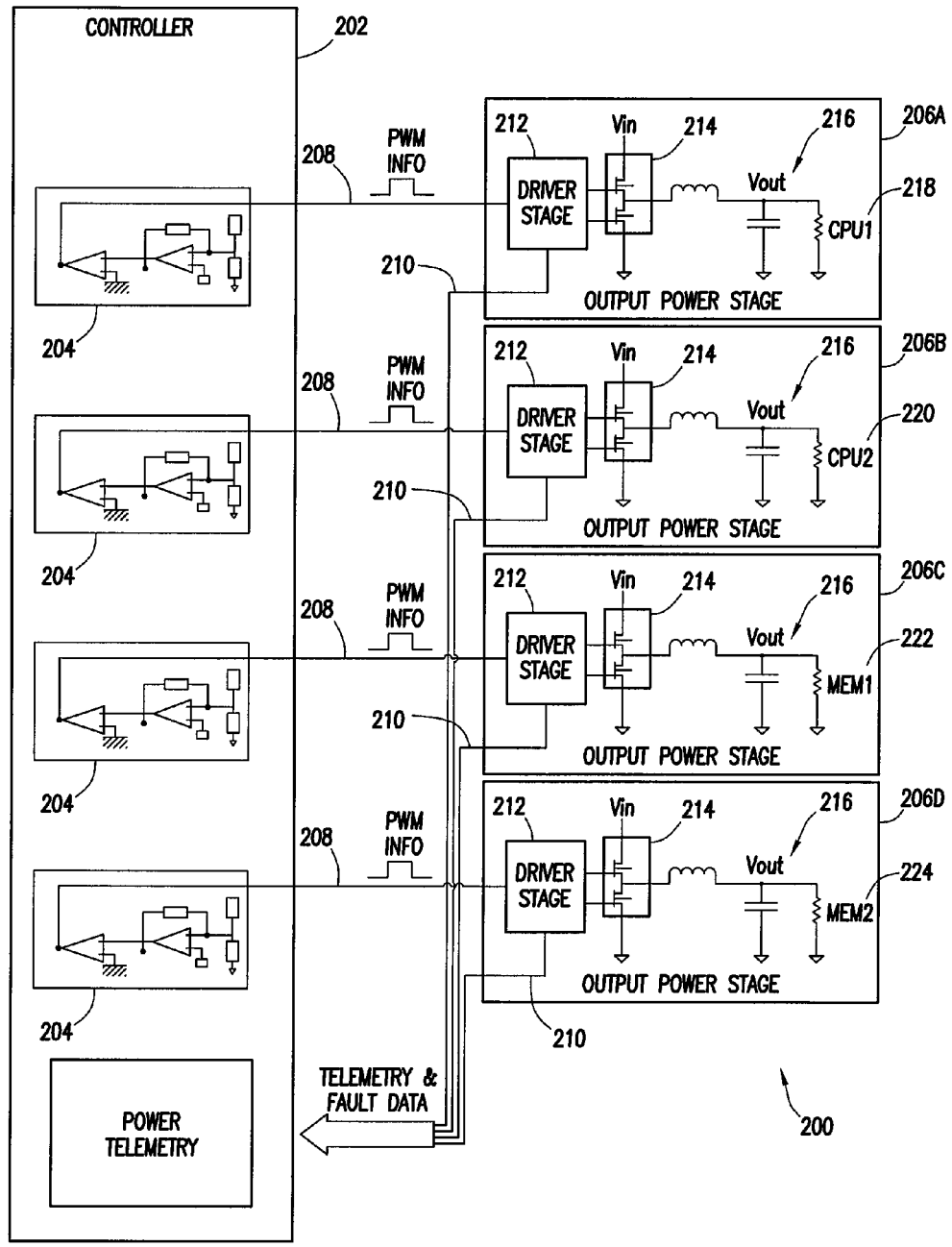
FIG. 2 is a block diagram of a power management system in accordance with an exemplary embodiment of the present invention.

FIG. 2 is a Centralized Integrated Power Management Controller (CIPMC) in accordance with an exemplary embodiment of the present invention, referenced generally with reference numeral 200. The CIPMC 200 combines all the required intelligence for control, monitoring, and management of the power subsystem into a centralized integrated controller 202. Accordingly, in a CIPMC 200 in accordance with the exemplary embodiment of the present invention, the PWM controller IC 204 which handles the intelligence functions of the power stages 206 is located within the controller 202. As would be appreciated by those of ordinary skill in the art, with the benefit of this disclosure, the controller 202 may be a microcontroller, a Central Processing Unit, (CPU), a CPU core, ASIC or Digital Signal Processing Integrated Circuit. The controller 202 controls a plurality of independent power stages 206 to control and regulate all of the various required system DC-DC output voltage rails in an information handling system.

In one embodiment, each power stage 206 may have a corresponding intelligence control unit which may be a PWM controller IC 204 in the controller 202. Although an exemplary circuitry for the intelligence control unit is depicted in FIG. 2, as would be appreciated by those of ordinary skill in the art, with the benefit of this disclosure, any pulse generation circuit, feedback circuit, or other suitable circuitry may be used as the intelligence control unit.

As would be appreciated by those of ordinary skill in the art, the power stages 204 may be placed at various locations in the information handling system as appropriate to meet the system power delivery requirements. In the exemplary embodiment depicted in FIG. 2, a first power stage 206A controls power delivery to a first Central Processing Unit, CPU1, 218 and a second power stage 206B controls power delivery to a second Central Processing Unit, CPU2 220. Similarly the third and the fourth power stages 206C, 206D control power delivery to a first and a second memory unit, Mem1 222 and Mem2 224, respectively. Although FIG. 2 depicts power delivery and control to CPUs and system memory, as would be apparent to those of ordinary skill in the art, with the benefit of this disclosure, the method and systems disclosed herein may be used to control power delivery to any system component.

As depicted in FIG. 2, the controller 202 is communicatively coupled to each power stages 206 through a control bus 208 and a power telemetry bus 210. The control input of all system power stages 206 is connected to the control bus 208. The control bus 208 may be used for sending control and pulse width information to each of the individual power stages 206. The requirement on the control bus 208 will be adequate response for Pulse Width Modulation information to be modulated, sent and demodulated by the power stages 206 to maintain control of the output of each power stage 206. The power telemetry bus 210 is used for transmitting the power telemetry data from each of the individual power stages 206 back to controller 202. The requirements imposed on the telemetry bus 210 include the ability to transmit a host power telemetry data back to the controller 202. As would be appreciated by those of ordinary skill in the art, with the benefit of this disclosure, the PWM controller IC 204 may then adjust the control signals sent to each power stage 206 depending on the telemetry data received from that power stage.

In one embodiment, the control bus 208 and/or the telemetry bus 210 are operable to perform digital modulation multiplexing techniques such as spread spectrum. The ability to perform digital modulation multiplexing allows for concurrent communication between the controller 202 and all power stages 206. As would be appreciated by those of ordinary skill in the art, with the benefit of this disclosure, a number of different signal multiplexing techniques may be used depending on the bandwidth and the data content required. Such multiplexing techniques include, but are not limited to, Frequency Division Multiplexing, Time Division Multiplexing, Time and Frequency Division Multiplexing, or Code Division Multiplexing.

As would be appreciated by those of ordinary skill in the art, with the benefit of this disclosure, the use of digital multiplexing techniques provides several benefits. For instance, when using digital multiplexing techniques, the magnitude of the actual information content signals are below the background noise levels but are individually demodulated by only the intended power stage 206, with its own unique code, thereby, providing noise immunity. Moreover, because the information signal is modulated using high frequency digital modulation, any parasitic effects of long Printed Wiring Board (PWB) traces are eliminated, in comparison to switching frequency signals of the power stage 204 during the demodulation stage. This allows the controller 202 and the power stages 206 to communicate at any location on the PWB.

Another advantage of using digital multiplexing techniques in accordance with an exemplary embodiment of the present invention is that the number of power stages 206 which may be controlled by the controller 202 is not limited to the particular physical package of the implemented IC's pin out limitation. Accordingly, the number of power stages to be controlled may be varied over a wide range. Specifically, in a system in accordance with an exemplary embodiment of the present invention, all the control inputs for each power stage 206 may be connected to the same output pins of the controller 202 and the controller 202 may address each power stage 206 individually using its corresponding modulation code. Similarly, power telemetry data may be transmitted from each power stage 206 back to the controller 202 through the same input pins of the controller 202. The controller 202 may then demodulate each power stage telemetry data based on its code key. Accordingly, the number of power stages 206 that may be controller by the controller 202 is not limited by the number of pins on the controller 202 and is only limited by the desired data resolution and the available band width.

Each power stage 206 may consist of an individual switching phase, multiples of interleaved switching phases, or pass elements designed to regulate to the appropriate output voltage. As depicted in FIG. 2, in one embodiment, the power stage 206 may consist of a driver stage 212, a power switching stage 214 and an output filter 216.

In one exemplary embodiment, each power stage 206 may further include the required circuitry (not shown) to monitor and transmit power telemetry data back to the controller 202. In one embodiment, the telemetry data may include the input voltage (Vin), the output voltage (Vout), the output current (Iout), the temperature, or information relating to other system characteristics. Additionally, each power stage 206 may include the requisite circuitry for transmitting the telemetry data back to the controller 202 for further aggregation and analysis.

Although the present disclosure has been described in detail, it should be understood that various changes, substitutions, and alterations can be made hereto without departing from the spirit and the scope of the invention as defined by the appended claims.

What is claimed is:

1. A Centralized Integrated Power Management Controller comprising:
   a controller;
   a power stage communicatively coupled to the controller through a control bus and a power telemetry bus, wherein the power telemetry bus transmits telemetry data from the power stage to the controller, wherein the telemetry data comprises an output current of the power stage;
   an intelligence control unit in the controller corresponding to the power stage;
   wherein the intelligence control unit drives the power stage through the control bus.

2. The system of claim 1, wherein one of the control bus and the power telemetry bus performs a digital modulation multiplexing technique.

3. The system of claim 2, wherein the digital modulation multiplexing technique is a spread spectrum technique.

4. The system of claim 2, wherein the digital modulation multiplexing technique is selected from the group consisting of Frequency Division Multiplexing, Time Division Multiplexing, Time and Frequency Division Multiplexing and Code Division Multiplexing.

5. The system of claim 1, wherein the intelligence control unit is selected from the group consisting of a pulse generation circuit and a feedback circuit.

6. The system of claim 1, wherein the power stage delivers power to a component selected from the group consisting of a central processing unit and a memory unit.

7. A method for centrally controlling a plurality of power stages comprising:
   communicatively coupling a controller disposed within an information handling system to each of the plurality of power stages of the information handling system through a control bus and a power telemetry bus;
   delivering control signals from the controller to each of the plurality of power stages through the control bus;
   receiving telemetry data at the controller from each of the plurality of power stages through the power telemetry bus, wherein the telemetry data comprises, wherein the telemetry data comprises an output current of the power stage; and
   adjusting the control signal sent to each of the plurality of power stages based on the telemetry data received from that power stage.

8. The method of claim 7, wherein the controller simultaneously communicates with two or more of the plurality of power stages.

9. The method of claim 8, wherein the controller simultaneously communicates with the two or more of the plurality of power stages using a digital multiplexing technique.

10. The method of claim 9, wherein the digital multiplexing technique is selected from the group consisting of Frequency Division Multiplexing, Time Division Multiplexing, Time and Frequency Division Multiplexing and Code Division Multiplexing.

11. The method of claim 7, wherein the number of power stages is not limited by the number of pins available on the controller.

12. The method of claim 7, wherein the number of power stages controlled by the controller is dependent on data resolution and available bandwidth.

* * * * *